Figure 1:
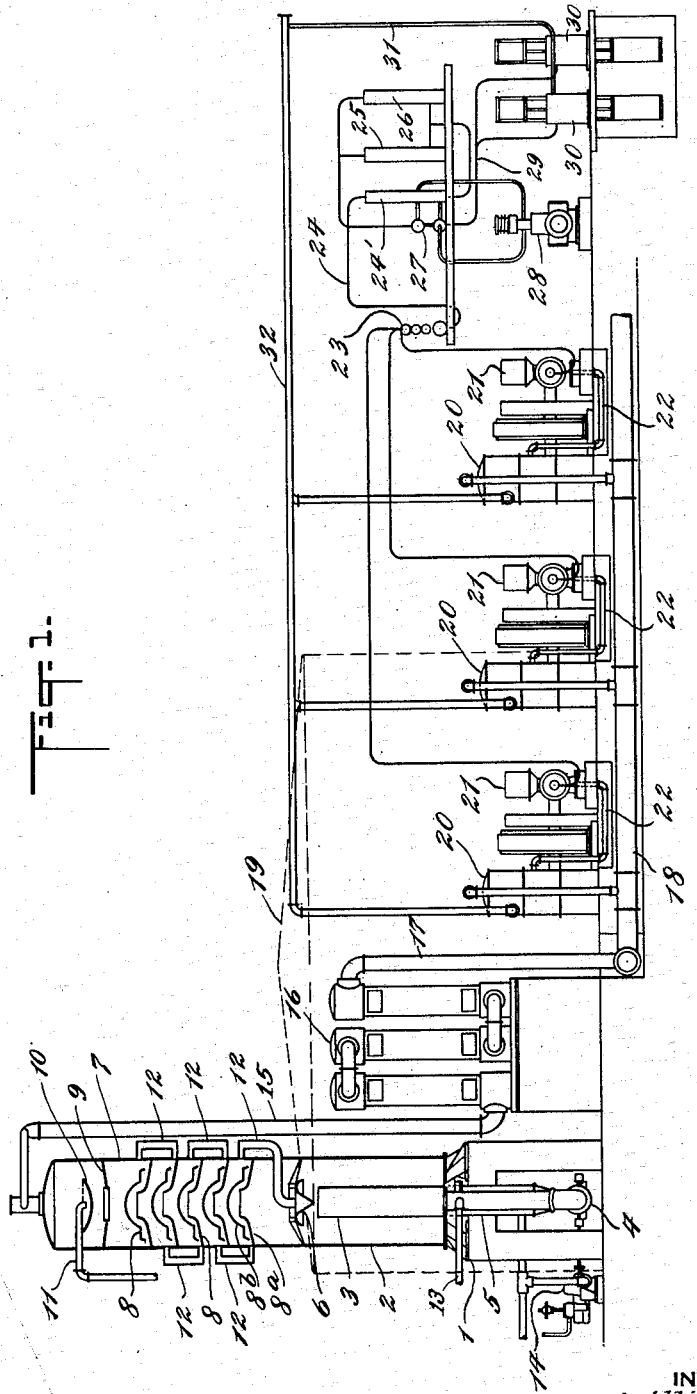

July 26, 1932.  W. D. MOUNT  1,868,755
DEHYDRATOR
Filed Oct. 20, 1930   2 Sheets-Sheet 2

INVENTOR
William D. Mount
BY
ATTORNEY

Patented July 26, 1932

1,868,755

UNITED STATES PATENT OFFICE

WILLIAM D. MOUNT, OF LYNCHBURG, VIRGINIA

DEHYDRATOR

Application filed October 20, 1930. Serial No. 489,967.

My invention relates to the art of producing solid carbon dioxide. The invention is especially directed to a method for dehydrating the carbon dioxide gas and includes the apparatus for carrying out the method.

In the manufacture of solid carbon dioxide, the carbon dioxide gas, in general, carries considerable moisture which must be removed therefrom during some stage in the process. This is especially true when the carbon dioxide is obtained from kiln exhaust gases by a process, such, for example, as that disclosed in my copending application Serial No. 489,966, filed October 20, 1930, in which the carbon dioxide is separated from the kiln gases by being absorbed by a solution of a carbonate, such as potassium or sodium carbonate, or a mixture of both. The bicarbonate solution, formed by the absorption of carbon dioxide gas by the carbonate, is decomposed by boiling, the pure carbon dioxide gas liberated being saturated with moisture.

By my invention the moisture contained in the carbon dioxide gas is eliminated by being frozen therefrom. In converting liquid carbon dioxide into carbon dioxide snow, 50% or more of the liquid carbon dioxide, depending upon the temperature at which the conversion takes place, passes into the form of gas. This gas is exceedingly cold, due to the adiabatic expansion of the liquid. My method is based upon the use of this cold gas for dehydrating the carbon dioxide gas received from the source, by freezing the moisture therefrom.

In accordance with my method, I mix the gas from the expansion chamber of the snow boxes with the moisture laden gas from the source of carbon dioxide. The temperature of the mixed gas is reduced considerably, far below the temperature at which moisture freezes. The moisture carried by the gas is therefore frozen into small solid particles. The gas is then separated from these frozen particles of moisture and delivered to the compressors.

I shall now describe the illustrated apparatus which is one embodiment of my invention and which is designed to carry out my method, and I shall thereafter point out my invention in claims.

Figure 2:
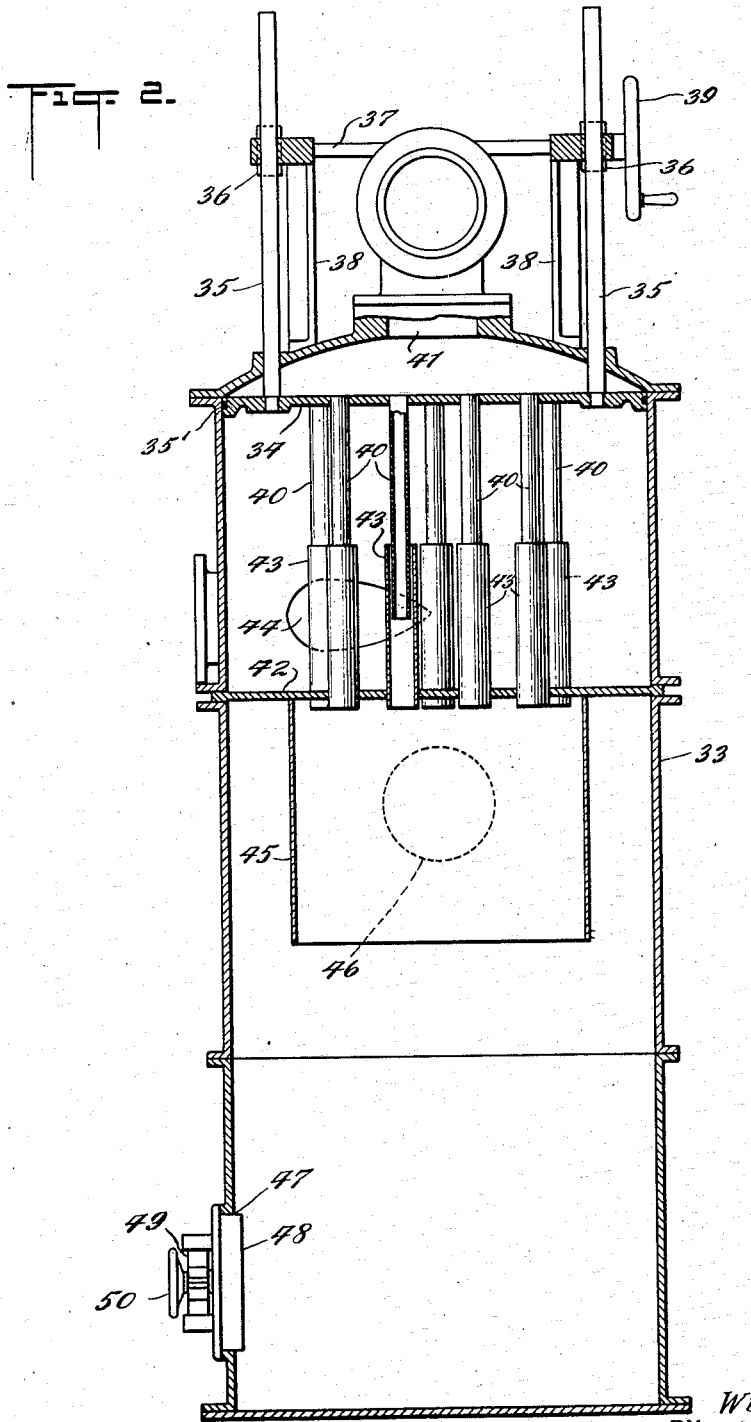

In the drawings:

Fig. 1 is a diagrammatic illustration of an apparatus which is one embodiment of my invention and which I utilize in carrying out my method; and Fig. 2 is a vertical section of the dehydrator.

In the drawings I have indicated the source of carbon dioxide gas as a decomposer 1 in which a bicarbonate is decomposed into the carbonate with the liberation of pure carbon dioxide. This decomposer consists of a preheating section in combination with a standard forced circulation, single effect evaporator. The evaporator, which is well known to those skilled in the art, consists of a vertical circular casing 2 in the center of which there is a vertical steam belt 3. The steam belt 3 consists of a cylindrical casing in which there are a plurality of tubes. The casing is provided with inlet and outlet openings for the admission of steam which decomposes the bicarbonate solution by boiling the same. The lower end of the steam belt 3 is connected to one side of a pump 4, the other side of the pump being connected to a circulation conduit 5 which communicates with the interior of the casing 2 at one side of the steam belt 3. The pump 4 at the bottom of the steam belt is provided to create a rapid circulation, through the tubes of the steam belt, of the liquor to be decomposed. Above the steam belt 3, adjacent the open end of the tubes, there is a deflector 6 comprising an inverted cone having a parabolic flange at the base thereof. The liquor ejected from the tubes strikes the deflector 6 and is deflected into the chamber formed by the casing 2 of the decomposer from whence it may again pass into the circulation conduit 5 and again through the tubes in the steam belt, the circulation of the liquor through the steam belt being continuous.

Above the deflector 6, is the preheater, which consists of a circular casing 7 having a plurality of baffles 8 therein, transversely thereof. Each of the baffles 8, shown as five in number, comprises a lower baffle plate 8a which has an upwardly extending central portion forming a throat-shaped opening therethrough. Above this baffle plate 8a there is a dome-shaped baffle plate 8b having a lateral perforated flange extending from the edge thereof. The plate 8b covers the throat-shaped upward extension formed in the lower baffle 8a. Above the topmost baffle 8, there is a plate 9 having an opening through the center thereof and immediately above the opening in the plate 9 there is a dish-shaped vessel 10 into which the bicarbonate solution is delivered through the inlet conduit 11. The bicarbonate solution, entering the vessel 10, overflows the sides thereof and passes downwardly through the opening in the transverse plate and on to the uppermost baffle 8. Overflow conduits 12 are provided for conducting the liquor from an upper baffle to a lower baffle. These overflow conduits 12 open into the preheater chamber a slight distance below the top of the upwardly extending throat-shaped section of the lower baffle plate 8a so that the liquor does not overflow the edge of the baffle but flows through the overflow conduits 12 to the next lower baffle. The level of the edge of the upwardly extending throat-shaped sections of the lower baffle plates 8a is such that the edges and perforated lateral flanges of the dome-shaped upper baffle plates 8b are submerged in the liquor. In this way, the hot carbon dioxide is caused to pass through the liquor as it passes upward through the preheater of the decomposer to the outlet in the top thereof. The decomposed bicarbonate or carbonate is withdrawn continuously through a conduit 13 tapped into the circulation conduit 5, and may be delivered to a carbonator, if desired.

The pump 4 at the bottom of the steam belt in the lower portion of the decomposer is driven by a steam turbine 14, the exhaust from which is supplied to the steam belt for boiling the bicarbonate to decompose the same.

The carbon dioxide gas resulting from the decomposition of a bicarbonate in the composer described immediately above, carries a considerable quantity of moisture, due to the high temperature at which the gas passes off from the decomposer. The gas is, therefore, led through a conduit 15 to a condenser 16. This condenser 16 is of standard construction and well known in the art. The condenser serves to remove, by condensing therefrom, a large quantity of the moisture contained in the carbon dioxide gas. The gas is not, however, completely dehydrated by the condenser because of the relatively high temperature at which it leaves the condenser.

From the condenser, the gas is delivered through a conduit 17 to a supply main 18 which communicates with a gas tank 19 which is adapted to receive and store excess gas. To the gas main 18 there is coupled, in multiple, dehydrators 20 wherein the carbon dioxide gas is completely dehydrated. These dehydrators 20 are of special construction and are included in my invention and will be hereinafter described in detail.

Associated with the dehydrators 20, there are three stage compressors 21 to which the dehydrated gas is delivered through a conduit 22, there being a pair of dehydrators (only one of which is shown) for each compressor. In the compressors 21 the gas is compressed to a pressure of approximately 1000 lbs. per sq. inch, and at that pressure, it is delivered to a condenser 23 wherein it is liquefied. This condenser 23 is of standard construction and is well known in the art of making solid carbon dioxide. From the condenser 23, the liquid carbon dioxide is delivered to a filter 24' through a conduit 24. This filter is connected in series with two filters 25 and 26, which are connected in multiple and adapted to be operated alternatively. These two filters 25 and 26 are provided so that one may be operated while the other is being cleaned. From the filters which remove oil and other foreign matter from the liquid, the liquid carbon dioxide is delivered to a heat interchanger 27 in which it pre-cooled.

The heat interchanger 27 is supplied with a cooling medium from a pre-cooling unit 28 which is of standard construction in the refrigerating art. In the heat interchanger 27, the liquid carbon dioxide is pre-cooled to a temperature of approximately minus 31° C. at which temperature 50% of the liquid, upon expansion thereof, is converted into carbon dioxide snow. The percentage of the liquid which is converted into carbon dioxide snow upon expansion is dependent upon the temperature at which the liquid is expanded. In order to obtain a greater percentage of conversion, the liquid would have to be pre-cooled to a greater degree. Further pre-cooling is, however, unwarranted with respect to the final economy of the system.

From the heat interchanger 27 the liquid is delivered through a conduit 29 to two snow boxes 30. These snow boxes may be of standard construction well known in the art. The liquid is suddenly expanded in the expansion chamber of the snow boxes, and the snow formed by the expansion of the liquid is compressed into a solid cake. That portion of the liquid carbon dioxide which passes off as a gas in the expansion chamber is returned by means of conduits 31 and 32, to the dehydrators 20.

These dehydrators consist of heavily insulated (insulation not shown) vertical, circular, cast iron casings 33. Within the casing 33, adjacent the upper end thereof, there is a movable partition plate 34. To the partition plate 34 there are connected, at diagrammatically opposite points, two racks 35 which extend through the top of the casing 33 and engage pinions 36 on a shaft 37 which is supported by brackets 38. On one end of the shaft 37, there is a handwheel 39 by means of which the movable partition plate 34 may be raised or lowered within the chamber. Around the edge of the partition plate 34 there is a compression ring 35' which serves to make the partition plate a gas-tight wall. Through the partition plate 34 there are a plurality of holes in which a plurality of tubes 40 are inserted, the tubes extending downwardly from the partition plate. Above the partition plate 34, in the top of the casing, there is an inlet opening 41 for the gas from the source of carbon dioxide supply.

About one third of the way down from the top of the casing there is a fixed partition plate 42 through which a plurality of tubes 43 extend, the tubes 43 extending upwardly from the partition plate. The tubes 43 in the stationary partition plate 42 correspond in number and location to the tubes 40 in the movable partition plate 34 and are of greater diameter than the tubes 40 extending downwardly from the movable partition plate 34. The tubes 40 extending from the movable partition plate 34 extend into the tubes 43, extending from the stationary partition plate 42, in telescopic relation therewith. Between the partition plates 34 and 42, adjacent the stationary partition plate 42, there is a tangential inlet 44 for the gas which is taken from the snow boxes 30. To the lower side of the stationary partition plate 42, there is secured a skirt or baffle 45 which surrounds the lower end of the tubes 43 extending through the partition plate 42. This skirt or baffle 45 also extends below the outlet opening 46, for the mixed gases, in the side of the casing which is below the fixed partition plate, and the open end of the tubes 43.

Near the lower end of the casing 33, there is an opening 47 through which the frozen drops of moisture may be removed from the dehydrators. This opening is closed by a door 48 which is secured to a bracket 49 that is hinged at one end thereof to the casing 33, and which may be locked at the other end. The door 48 is movable laterally of the bracket 49 and a hand-wheel 50 is provided by means of which the door may be forced into tight contact with the edges of the opening 47.

In the operation of this dehydrator, the gas from the source of supply, or, in this instance, from the condenser 16 is delivered to the dehydrator through the inlet opening 41 in the top of the casing 33. This gas passes down through the tubes 40 in the movable partition plate 34 and through the tubes 43 in the stationary partition plate 42. The gas returning from the snow boxes 30 is delivered through the inlet 44 into the chamber formed between the partition plates 34 and 42. This gas passes into the annular space formed by the tubes 40 extending from the partition plate 34 within the tubes extending from the plate 42. At the end of the tubes 42 extending from the movable partition plate 34, this annular ring of cooled gas mixes with the gas from the source of supply, lowering the temperature thereof and freezing therefrom, in the form of solid particles, the moisture contained therein. The mixed gas then proceeds around the skirt or baffle 45 to the outlet, the frozen particles of moisture falling to the bottom of the casing 33.

The tubes 40, extending from the movable partition plate 34, are movable in the tubes 42, extending from the stationary partition plate 43, so that they may be adjusted therein to obtain the proper position of the tubes to prevent the moisture from freezing in the openings of the tubes and clogging the tubes to interfere with the passage of the gas therethrough.

It is obvious that my method is in no wise limited to the particular apparatus illustrated and above described for its performance and that various changes may be made in the details of the apparatus by those skilled in the art within the principle and scope of my invention as pointed out in the appended claims.

I claim:

1. In the process of manufacturing solid $CO_2$ which includes first converting the gas to a liquid and then reducing the pressure on the liquid in an expansion chamber under conditions to convert it partially to a solid and partially to a gas, the step which consists of dehydrating the gas by mixing with it the cold gas from the expansion chamber and separating from the gas the moisture solidified thereby.

2. In the process of manufacturing solid $CO_2$ which includes first converting the gas to a liquid and then reducing the pressure on the liquid in an expansion chamber under conditions to convert it partially to a solid and partially to a gas, the steps which consist in heating a solution of a bicarbonate and thereby driving off moisture laden $CO_2$ gas, and dehydrating the gas by mixing with it the cold gas from the expansion chamber and separating from the gas the moisture solidified thereby.

3. The method of dehydrating carbon dioxide gas in the preparation of solid carbon dioxide which comprises mixing the gas to be dehydrated with cold gas taken from the expansion chamber, and separating the gas from the frozen moisture.

4. A dehydrator comprising a closed vessel having an inlet opening for the gas to be dehydrated and an inlet opening for cold gas to be mixed with the gas to be dehydrated for freezing the moisture carried therein, two sets of tubes within said vessel, the tubes of one set telescoping with the tubes of the other set, and one set of tubes being adapted to receive the gas entering one of said inlet openings and the other set of tubes being adapted to receive the gas entering the other inlet opening, and means for separating the gas and the frozen moisture.

5. A dehydrator for dehydrating a gas comprising a closed vessel having an inlet opening for the gas to be dehydrated and an inlet opening for previously cooled gas to be mixed with the gas to be dehydrated for freezing the moisture carried therein, two sets of tubes within said vessel, the tubes of one set telescoping within the tubes of the other set, means for directing the gas entering one of said inlet openings into the tubes of lesser diameter, means for directing the gas entering the other of said inlet openings into the ends of the tubes of greater diameter from which the tubes of lesser diameter extend, and means for separating the gas and the frozen moisture.

6. A dehydrator for dehydrating a gas comprising a closed vessel having an inlet opening for the gas to be dehydrated and an inlet opening for a previously cooled gas to be mixed with the gas to be dehydrated for freezing the moisture carried therein, two sets of tubes within said vessel, the tubes of one set telescoping within the tubes of the other set and being axially movable with respect thereto, means for directing the gas entering one of said inlet openings into the tubes of lesser diameter, means for directing the gas entering the other of said inlet openings into the ends of the tubes of greater diameter from which the tubes of lesser diameter extend, and means for separating the gas from the frozen moisture.

7. A dehydrator for dehydrating a gas comprising a closed vessel having an inlet opening through one end thereof for the gas to be dehydrated, a partition plate adjacent the end of said vessel having the inlet opening therein, a second partition plate removed from said first partition plate and forming a chamber therewith, said vessel having an inlet opening in the side thereof between the partition plates for a previously cooled gas to be mixed with the gas to be dehydrated to freeze the moisture contained therein, a plurality of tubes extending through said first mentioned partition plate into the chamber formed by said partition plates, a corresponding number of tubes of greater diameter extending through said second mentioned partition plate into the chamber formed by the partition plates, said first mentioned tubes telescoping within said second mentioned tubes, and means for separating the gas from the frozen moisture.

8. A dehydrator for dehydrating a gas comprising a closed vessel having an inlet opening through one end thereof for the gas to be dehydrated, a movable partition plate adjacent the end of said vessel having the inlet opening therein, a stationary partition plate removed from said movable partition plate and forming a chamber therewith, said vessel having an inlet opening in the side thereof between the partition plates for a previously cooled gas to be mixed with the gas to be dehydrated to freeze the moisture contained therein, a plurality of tubes extending through said movable partition plate into the chamber formed by said partition plates, a corresponding number of tubes of greater diameter extending through said stationary partition plates into the chamber formed by the partition plates, said first mentioned tubes telescoping within said second mentioned tubes, and means for separating the gas from the frozen moisture.

9. A dehydrator for dehydrating a gas comprising a closed vessel having an inlet opening through the upper end thereof, a movable partition plate adjacent the upper end of the vessel, a stationary partition plate removed from said movable partition plate and forming a chamber therewith, said vessel having an inlet opening through the side thereof between the partition plates for previously cooled gas to be mixed with the gas to be dehydrated to freeze the moisture contained therein, a plurality of tubes extending through the movable partition plate into the chamber formed by the partition plates, a corresponding number of tubes of greater diameter extending through the fixed partition plate into the chamber formed by the partition plates, the first mentioned tubes telescoping within the second mentioned tubes, and a baffle extending downwardly from the stationary partition plate and surrounding the ends of the tubes extending therethrough, the wall of said vessel having a gas outlet between the stationary partition plate and the end of the baffle.

In witness whereof, I hereunto subscribe my signature.

WILLIAM D. MOUNT.